Figure 1:
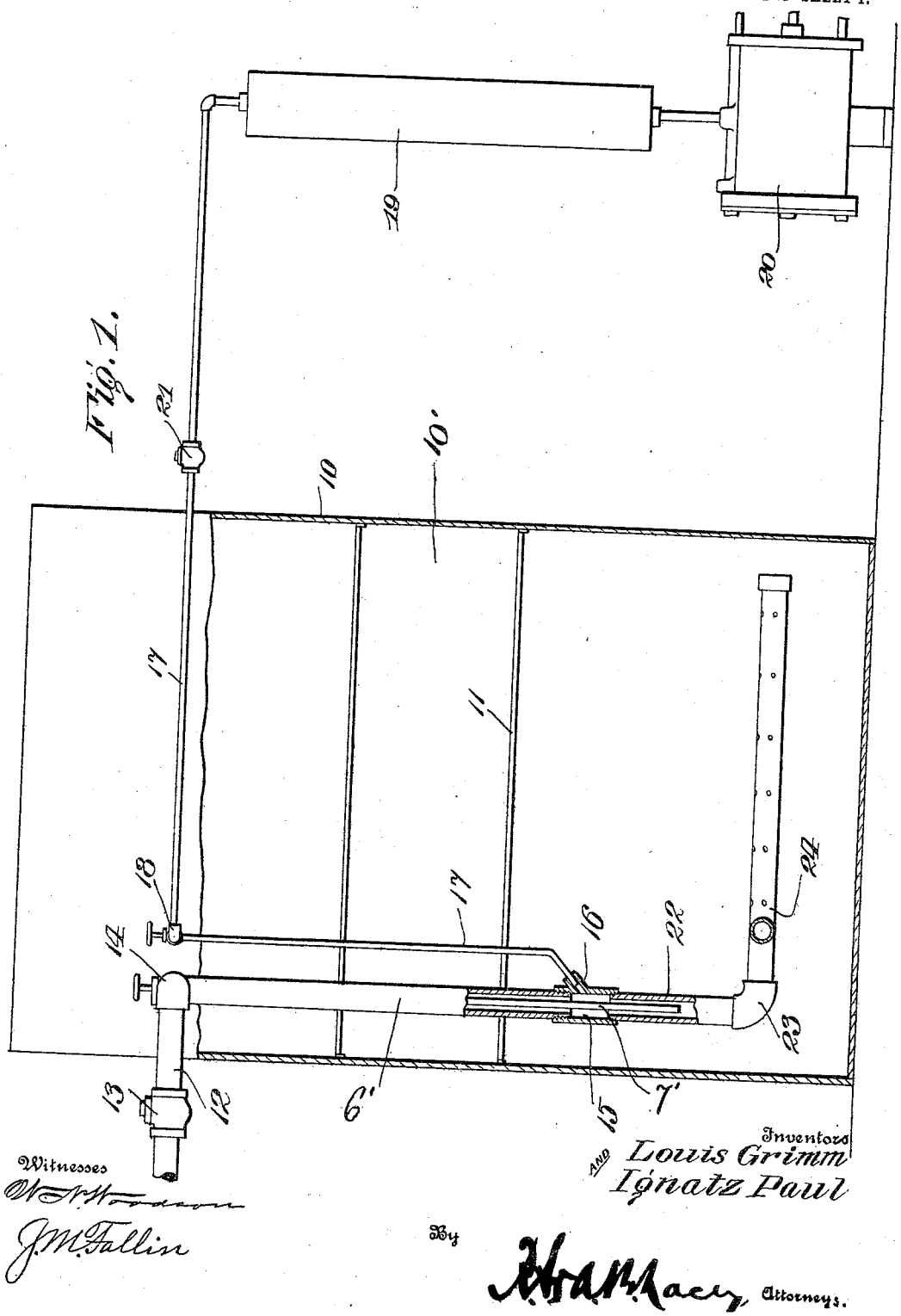

L. GRIMM & I. PAUL.
MEAT CURING APPARATUS.
APPLICATION FILED APR. 21, 1909.

994,919.

Patented June 13, 1911.

2 SHEETS—SHEET 1.

Witnesses
Inventors
Louis Grimm
Ignatz Paul
By
Attorneys.

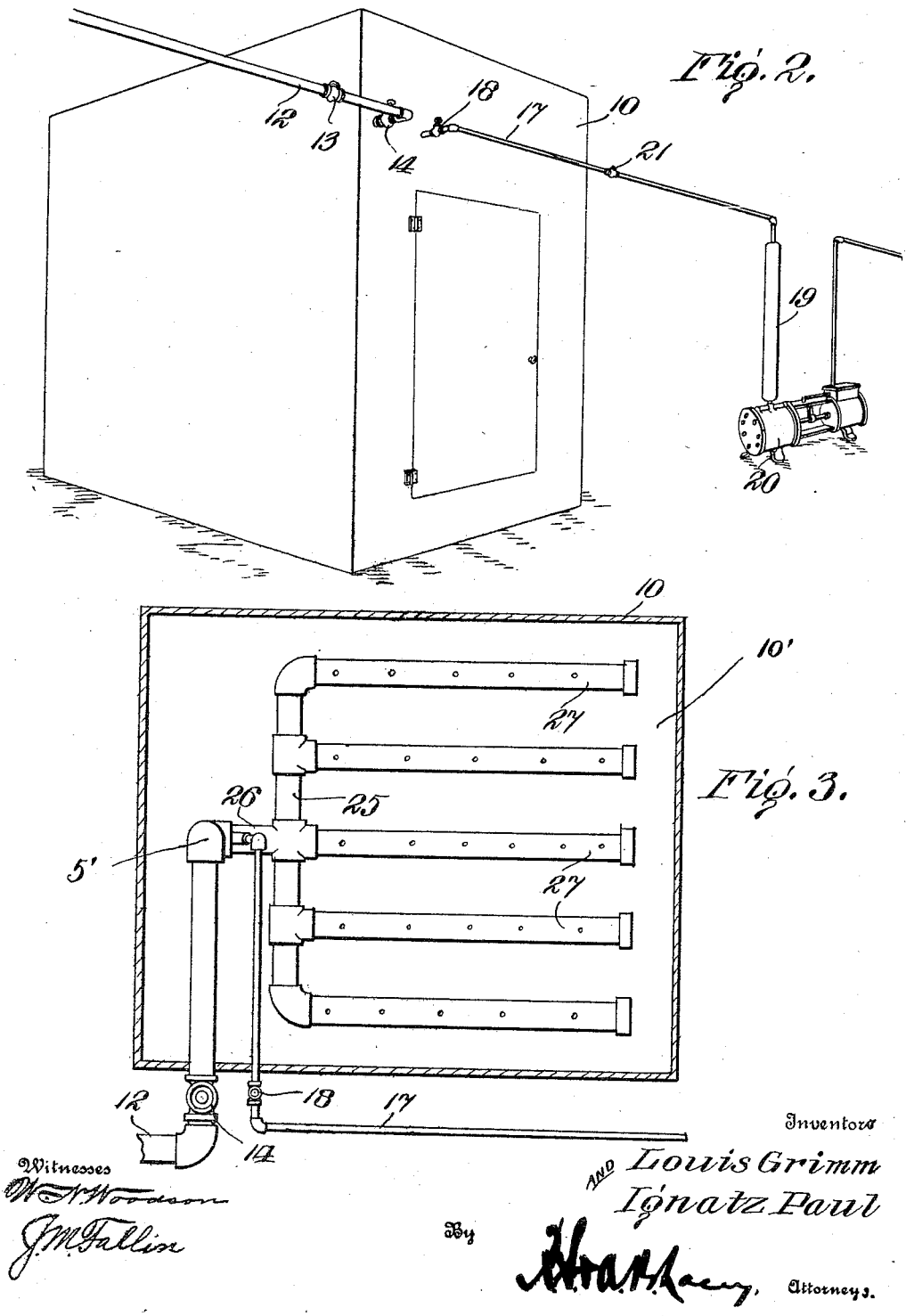

UNITED STATES PATENT OFFICE.

LOUIS GRIMM AND IGNATZ PAUL, OF NEW YORK, N. Y.

MEAT-CURING APPARATUS.

994,919.  Specification of Letters Patent.  Patented June 13, 1911.

Application filed April 21, 1909. Serial No. 491,402.

*To all whom it may concern:*

Be it known that we, LOUIS GRIMM and IGNATZ PAUL, citizens of the United States, both residing in New York, in the county of New York and State of New York, have invented certain new and useful Improvements in Meat-Curing Apparatuses, of which the following is a specification.

This invention relates to devices for curing meats and the like and refers particularly to an apparatus for smoking the same.

The invention has for an object the provision of means for curing meat by the employment of gas and air which is admitted into a chamber in which the meat is placed, means being provided for regulating the amount of air and gas admitted to said chamber.

The invention further contemplates a system of burners by means of which an intense heat may be produced with a comparatively small consumption of fuel.

The invention further aims at the production of a device of this character which will cure meats in a comparatively short time and which may be operated economically thereby producing a device which will save great loss of time and labor.

For a full understanding of the invention reference is to be had to the following description and accompanying drawings, in which:—

Figure 1 is a vertical transverse section through the chamber and mixer. Fig. 2 is a perspective view of the plant, and Fig. 3 is a horizontal section through the device.

Corresponding and like parts are referred to in the following description and indicated in all the views of the drawings by the same reference characters.

Referring to the drawings the numeral 10 designates a casing or smoke house having an interior chamber 10' in which the meat to be cured is hung upon suitable racks 11 mounted in any convenient position therein. A gas supply pipe 12 which is provided with a check valve 13 is extended into the chamber 10 adjacent the upper end of the same and is further provided with a valve 14 to regulate the inflow of gas into the chamber 10. The pipe 12 is provided with an elbow 5' to which is connected a depending pipe section 6', the lower end of said pipe section being extended to a point near the bottom of the chamber 10' for connection with a coupling 15. The coupling 15 is provided with an upwardly inclined nipple 16 to which the lower extremity of an air pipe 17 is secured, the air pipe 17 being extended up in parallel relation to the pipe section 6' and conducted through the side of the chamber 10 to a regulating valve 18. The air pipe 17 extends from the regulating valve 18 to a suitable reservoir or air chamber 19 which receives air from a suitable compressor 20. Disposed within the pipe section 6', is a gas conducting tube 7', the lower end of which extends below the nipple 16 so as to prevent the air entering through the pipe 17 from checking the flow of gas and also to cause the mixing of air and gas at a point below the nipple 16. A check valve 21 is disposed in the pipe 17 between the regulating valve 18 and the air chamber 19 for the purpose of preventing the inflow of gas from the pipe 12 through the connection 15 back into the chamber 19. The connection 15 carries a depending pipe 22 which is provided with an elbow 23 which is disposed upon an intermediate portion of a burner 24. The burner 24 is peculiarly constructed for application in the lower end of the chamber 10' and comprises a tube 25 which carries intermediately thereof a rearwardly extended portion 26 for engagement in the elbow 23. The tube 25 is further provided with a plurality of outwardly extended pipes 27 disposed in parallel relation to one another and extended across the lower end of the chamber 10', the pipes 27 being suitably apertured to permit of the flow of gas therefrom which is ignited and produces an intense flame. When the valves 14 and 18 are properly adjusted the flame will be of a greenish blue color which is indicative of intense heat.

The improved feature of this invention is the introduction of gas and air separately into the chamber 10 and the mixing of the same therein to form a gas which is under constant pressure and which contains the required amount of oxygen for the effective curing of the meats and which also produces an intense heat during the combustion of the gas.

It is readily observed that from the arrangement and construction of this plant a very suitable and economical means is employed for curing meats and the like and that the same may be maintained economically insomuch that the means for compressing the air will be practically the only power which is necessary for the operation of the plant. In small plants this compression of air may be maintained by a manually operated compressor which will store a sufficient amount of air in the air chamber 19 which may be withdrawn during the operation of the plant and fed to the burner 24 so that the air chamber 19 may be replenished from time to time, it not being necessary to maintain a constant compressing action of the air within the same. An essential feature, however, of this invention resides in the provision of a constant source of compressed air so that the flame is not dependent upon the surrounding oxygen for the complete combustion of the fuel and is not susceptible to variations by lateral drafts of air about the entrance of the air to the burners. The continuous feeding of the air to the burner insures a flame which is even and uniform during its burning and which therefore retains the chamber at a uniform temperature.

Having thus described the invention what is claimed as new is:—

1. A meat curing apparatus including a casing having an interior chamber, a gas supply pipe extending through one wall of the casing near the top thereof and provided with a depending pipe section and having a laterally extending nipple, a rigid horizontally disposed burner supported on the lower end of the pipe section and spaced from the bottom of the casing, a gas conducting tube centered within the pipe section and extending through the nipple, and below said nipple to a point near the burner an air supply pipe connected with the nipple, check valves connected in the gas and air supply pipes, and regulating valves also connected in the air and gas pipes for controlling the admission of air and gas to the burner.

2. A meat curing apparatus including a casing having an interior chamber, a gas supply pipe extending through one wall of the casing at the upper portion thereof and provided with an elbow coupling, a pipe section depending from the gas supply pipe and connected to the elbow coupling, a plurality of horizontally disposed burners rigidly secured to the pipe section and spaced from the bottom of said chamber, a coupling connected in said pipe section above the burners and provided with an upwardly inclined nipple, an air supply pipe engaging the nipple and extending through one wall of the casing for connection with an air compressor, a gas conducting tube centered within the pipe section and having its lower end extended through and below the nipple to a point near the burner, check valves connected in the gas and air supply pipes, respectively, and regulating valves also connected in the air and gas supply pipes for controlling the admission of air and gas to the burners.

3. A meat curing apparatus including a casing having an interior chamber, a gas supply pipe extending through the front of the casing near the top thereof, a pipe section depending from the gas supply pipe and having its lower end extended to a point near the bottom of the chamber, a plurality of horizontally disposed burners rigidly secured to the lower end of the pipe section, a coupling connected in the pipe section and provided with an upwardly inclined nipple, a gas conducting tube centered within the pipe section and having its lower end extended through the nipple and terminating at a point between the coupling and burners, an air supply pipe extending through one wall of the casing and having one end thereof operatively connected with a source of compressed air and its other end provided with a depending branch pipe arranged on one side of and disposed parallel with the depending section of the gas supply pipe and having its lower end inclined downwardly and connected with the nipple and gas supply pipes, and regulating valves also connected in the air and gas supply pipes between the check valves and burners for controlling the flow of air and gas to said burners.

In testimony whereof we affix our signatures in presence of two witnesses.

LOUIS GRIMM. [L. S.]
IGNATZ PAUL. [L. S.]

Witnesses:
CONRAD A. GRIMM,
ALBERT HALLHEIMER.